(12) United States Patent
Cavallo et al.

(10) Patent No.: US 11,010,176 B2
(45) Date of Patent: May 18, 2021

(54) PERSONALIZED INTERACTIVE DATA PRESENTATION THROUGH AUGMENTED REALITY

(71) Applicant: International Business Machines Corporation, Armonk, NY (US)

(72) Inventors: Marco Cavallo, Yorktown Heights, NY (US); Jenna Reinen, Yorktown Heights, NY (US); Ravi Tejwani, Yorktown Heights, NY (US); Aldis Sipolins, Yorktown Heights, NY (US); Hui Wu, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/157,310

(22) Filed: Oct. 11, 2018

(65) Prior Publication Data
US 2020/0117484 A1 Apr. 16, 2020

(51) Int. Cl.
*G06F 9/451* (2018.01)
*G06T 19/00* (2011.01)
*G06F 16/43* (2019.01)

(52) U.S. Cl.
CPC .............. *G06F 9/451* (2018.02); *G06F 16/43* (2019.01); *G06T 19/006* (2013.01)

(58) Field of Classification Search
CPC .............................. G06F 9/451; G06T 19/006
USPC ........................................................ 345/633
See application file for complete search history.

(56) References Cited

U.S. PATENT DOCUMENTS

| 2013/0307870 | A1* | 11/2013 | Ashbrook | G06F 21/84 345/629 |
| 2015/0062158 | A1* | 3/2015 | Hildreth | G02B 27/017 345/633 |
| 2015/0200922 | A1* | 7/2015 | Eschbach | H04L 63/08 358/1.14 |
| 2016/0188125 | A1 | 6/2016 | Kaplan et al. | |
| 2016/0284127 | A1 | 9/2016 | Rakshit et al. | |

OTHER PUBLICATIONS

F. Ledermann and D. Schmalstieg, "APRIL: a high-level framework for creating augmented reality presentations," IEEE Proceedings. VR 2005. Virtual Reality, 2005., Bonn, 2005, pp. 187-194. (Year: 2005).*
Mel, et al. "The NIST Definition of Cloud Computing", Recommendations of the National Institute of Standards and Technology. Nov. 16, 2015.
(Continued)

*Primary Examiner* — Shivang I Patel
(74) *Attorney, Agent, or Firm* — Anthony Curro, Esq.; McGinn IP Law Group, PLLC

(57) ABSTRACT

A data presentation method through augmented reality, system, and computer program product include creating a file container for a presentation that supports raw data embedding and definition of available interactions and levels of confidentiality of information for the presentation, streaming presentation content from the file container to a plurality of augmented reality devices, and generating a personalized individual interactive experience of the presentation content for at least one person wearing an augmented reality device in the plurality of augmented reality devices.

14 Claims, 5 Drawing Sheets

(56) References Cited

OTHER PUBLICATIONS

Fuhrmann, et al., "Interactive content for presentations in virtual reality", In Proceedings of the ACM symposium on Virtual reality sofrtware and technology (VRST '01) 2001. ACM, New York, NY, USA, 183-189.

* cited by examiner

PERSONALIZED INTERACTIVE DATA PRESENTATION THROUGH AUGMENTED REALITY

BACKGROUND

The present invention relates generally to a data presentation method through augmented reality (AR), and more particularly, but not by way of limitation, to a system, method, and computer program product for leveraging augmented reality for making data presentations interactive and customizable for each person in the audience.

Group presentations are widely used in everyday life in both business and educational settings. Despite its first introduction, presentation software (e.g. PowerPoint™, Keynote™, etc.) has not changed since its inception nor has the means of communication between the presenter and the audience.

Conventionally, content is presented in the form of slides whose content is static and equal to all people in the audience, independently of their level of interest or understanding. Presenters cannot pack too much content into each slide and have to filter, in advance, the information to present.

That is, conventional methods of presenting information do not allow content personalization or interaction with the data to manipulate the data, but instead offer the same static content to all people in the audience indistinctively. The amount of presentable content and context information is also limited by the size of each slide.

Therefore, a method is needed to leverage augmented reality for making data presentations interactive and customizable for each person, individually, in the audience.

SUMMARY

In an exemplary embodiment, the present invention provides a method for creating a file container for a presentation that supports raw data embedding and definition of available interactions and levels of confidentiality of information for the presentation, streaming presentation content from the file container to a plurality of augmented reality devices, and generating a personalized individual interactive experience of the presentation content for at least one person wearing an augmented reality device in the plurality of augmented reality devices. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
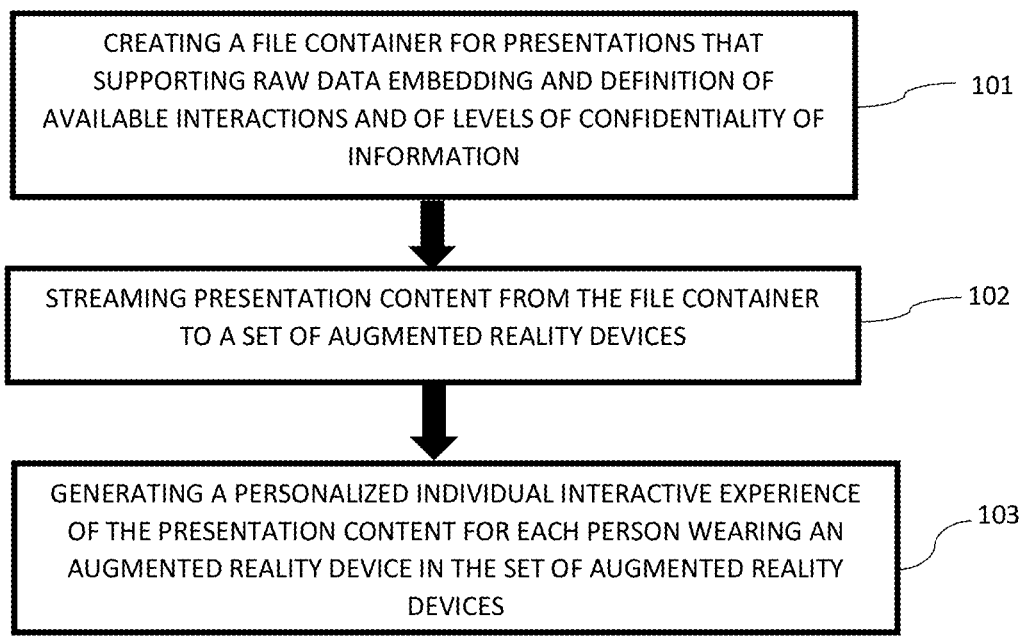
FIG. 1 exemplarily shows a high-level flow chart for a data presentation method 100 according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a data presentation method 100 according to the present invention can include various steps for inspecting, querying, filtering, analyzing and visualizing data of a presentation without interrupting the speaker to deliver a personalized individual interactive experience of a presentation.

Thus, in the invention during a presentation, a new file container for presentations can be created such that each user can have a private and different way of interacting with the data, accommodating his interests, questions or level of education.

Figure 3:
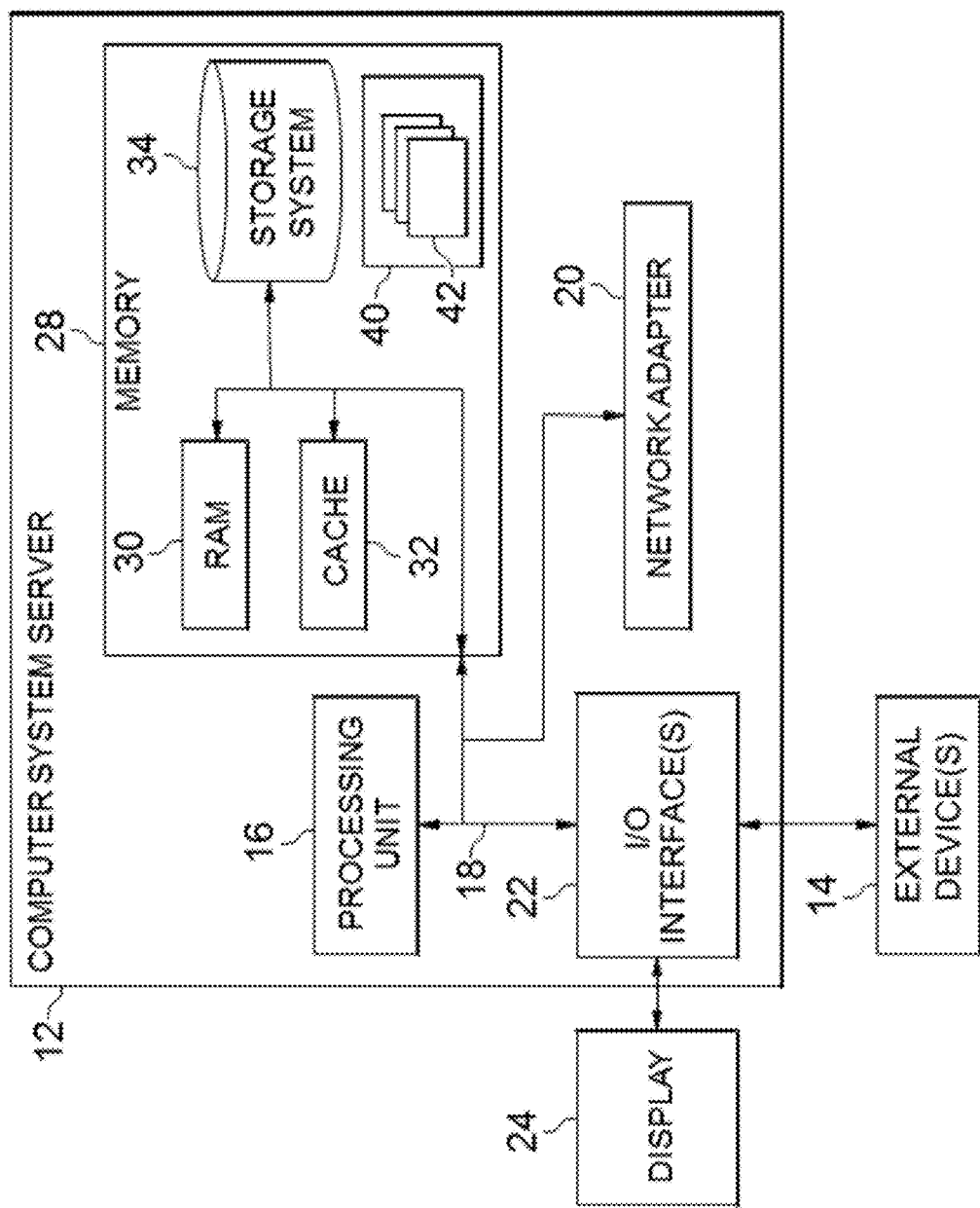
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 5), it is nonetheless understood that the present invention can be implemented outside of the cloud environment.

Referring to FIG. 1, the method 100 implements a method for an augmented reality delivered via an augmented reality (AR) device to facilitate enhanced presentations with customizable/individualized content for each user without a need to interrupt the presenter or clutter the presentation slides.

More specifically, in step 101, a new type of file container (e.g., .pptar instead of .ppt) is created for presentations which has more functionalities than the standard .ppt file, and which one of ordinary skill in the art taking the present application as a whole can create. The new type of file container supports raw data embedding including definitions of available interactions and levels of confidentiality of information. The file format, generated by a dedicated software or converted from an existing file includes not just text and images, but also raw data and interaction modalities.

The file container can be opened with a dedicated software on a computer of the presenter, thereby generating a classical slideshow-based presentation. However, the presenter's computer also acts as a server and takes care of streaming the content to the audience. The audience is wearing augmented reality headsets with a dedicated software to receive the presentation information through the network, without the need for locally owning the same file container. Alternative infrastructures can be supported (e.g. distribution of the .pptar file, file serving through a dedicated hosting).

It is noted that the file container includes a new file format with more capabilities than a normal presentation including 3-dimensional rendering, personalized access and interaction including interaction via an AR device. The file container includes definitions of user-specific access to the presentation information or user-specific allowed interactions (e.g., what the user can generate for their personalized individual interactive experience in step 103). For example, some user's viewing a presentation may not have access to the proprietary data but another user may depending upon each user's privileges. The file container can include restrictions such that each user can access specific data and query the data based on their clearance. Also, the new format includes the possibility to store raw data and make it available for analysis by the audience.

In step 102, presentation content is streamed from the file container to a set of augmented reality devices. Based on the interaction modalities and levels of confidentiality defined in the .pptar file, each user can access contextual information and interact with data in an augmented reality, on top of being able to see and hear the live presentation and the presenter. In other words, each user can dictate their own personal experience with the presentation by querying the file container for modified data (e.g., to answer their questions).

Figure 2:
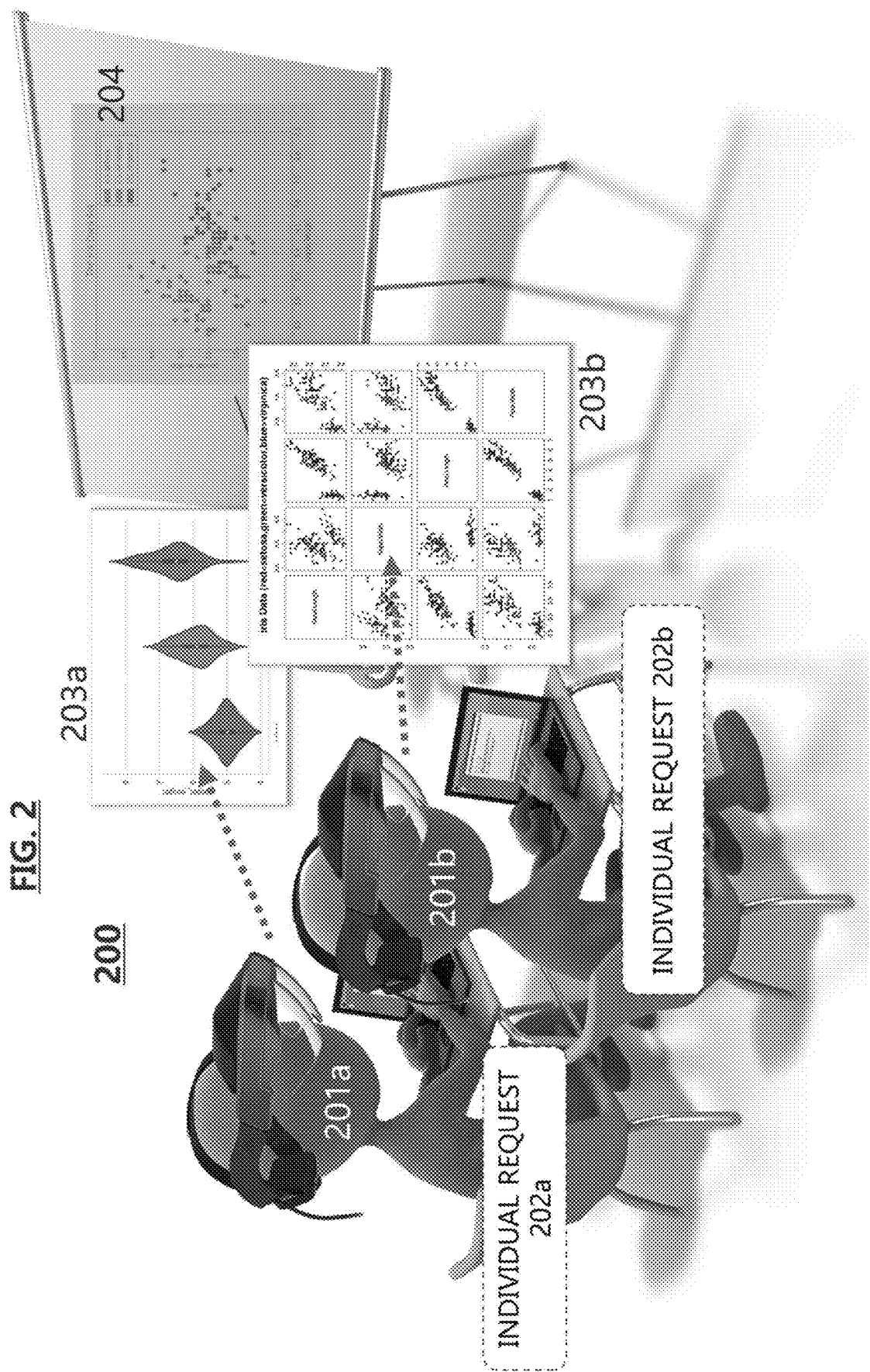
FIG. 2 exemplarily depicts a personalized individual interactive experience of presentation content according to an embodiment of the present invention.

For example, referring generally to FIG. 2, each user 201a and 201b is wearing an augmented reality device in the set of augmented reality devices for viewing the presentation 204. The presentation 204 is streamed to each of the individuals augmented reality devices.

In step 103, a personalized individual interactive experience of the presentation content for each person wearing an augmented reality device in the set of augmented reality devices is generated.

That is, on top of a direct interaction between the users 201a and 201b with the presentation 204 and the presenter, the user can also query and filter the data. And, an interactive artificial intelligence (AI) agent can be provided to help the augmented reality user web crawl definitions. Also, multimedia files or explanations can be provided to improve his understanding of the presentation and complement the existing information.

For example, as depicted in FIG. 2, each user can send in real-time (i.e., while viewing/receiving the presentation) an individual request 202a or 202b for a personalized individual interactive experience of the presentation content based on questions they may have. Because each user individually queries the presentation, the augmented reality device can provide the content without interrupting the presenter and be tailored to the education and needs of each viewer. As seen in FIG. 2, based on the individual request of each user, different content (203a/203b) is provided to the user, independently of the other user, to answer each of the user's specific questions.

Moreover, since the augmented reality device interacts with the file container, a user can be at a third party location (e.g., not at the presentation location) and still be able to query the presentation and generate the personalized individual interactive experience of the presentation content.

It is noted that the presenter is able to control and define a priori, through the file container, which groups of people will be able to see what and how each user can interact with different types of content available in the presentation. That is, the file container can provide an interaction in a double-linked flow between presenter and listener via the augmented reality interaction personalized content, where the presenter has defined the behavior of the presentation a priori. Each person in the audience also has the possibility to have their own independent augmented reality experience, separated from the other users. Thus, the user can determine their presentation experience by requesting modified content via the augmented reality device.

In one embodiment, the file container can be opened with a dedicated software on the computer of the presenter, generating a classical slideshow-based presentation. However, the presenter's computer may also act as a server and take care of streaming the content to the audience. The audience may wear augmented reality headsets with a dedicated software to receive the presentation information through the network, without the need for locally owning the same file container.

Alternative infrastructures can be supported (e.g. distribution of the file container, file serving through a dedicated hosting, etc.). Based on the interaction modalities and levels of confidentiality defined in the file container, each user can access contextual information and interact with data in augmented reality, on top of being able to see and hear the live presentation and the presenter.

On top of direct interaction through gestures and gaze to perform visualization, querying, and filtering of the data, an interactive artificial intelligence agent can be provided to help the AR user web crawl definitions, multimedia files or explanations to improve his understanding of the presentation and complement the existing information.

Thereby, the method 100 can provide access to personalized content such that each user can have a private and different way of interacting with the data (i.e., each user is presented different forms of the same data or even different data), accommodating his interests, questions or level of education.

It is noted that in one embodiment, the invention may not require augmented reality or an augmented reality device to function. For example, in the embodiment, the invention may merely display the data on a device owned by the user (e.g., a laptop, desktop, tablet, smartphone, etc.). Alternatively, the invention may be extended to non-AI virtual reality.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
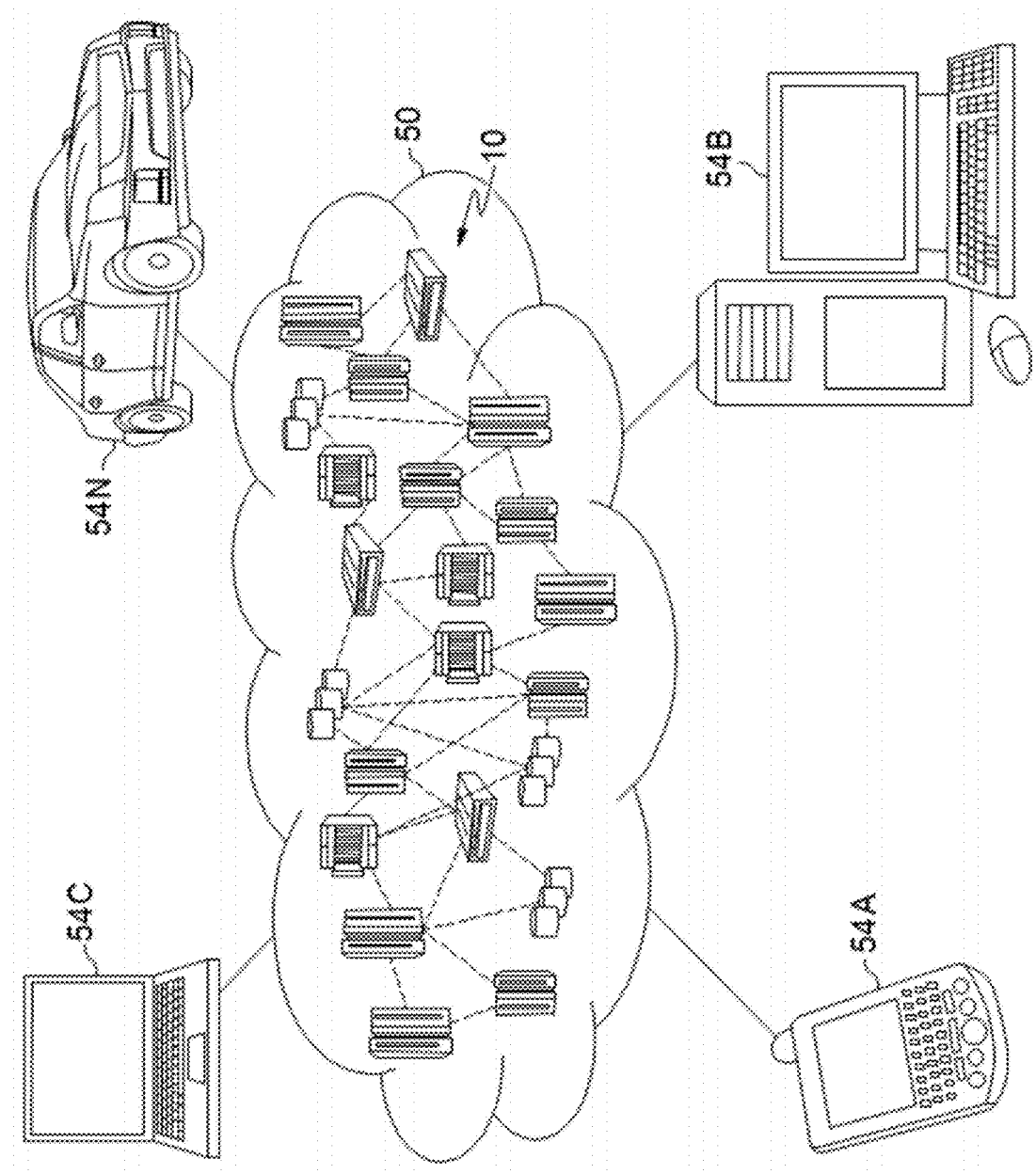
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
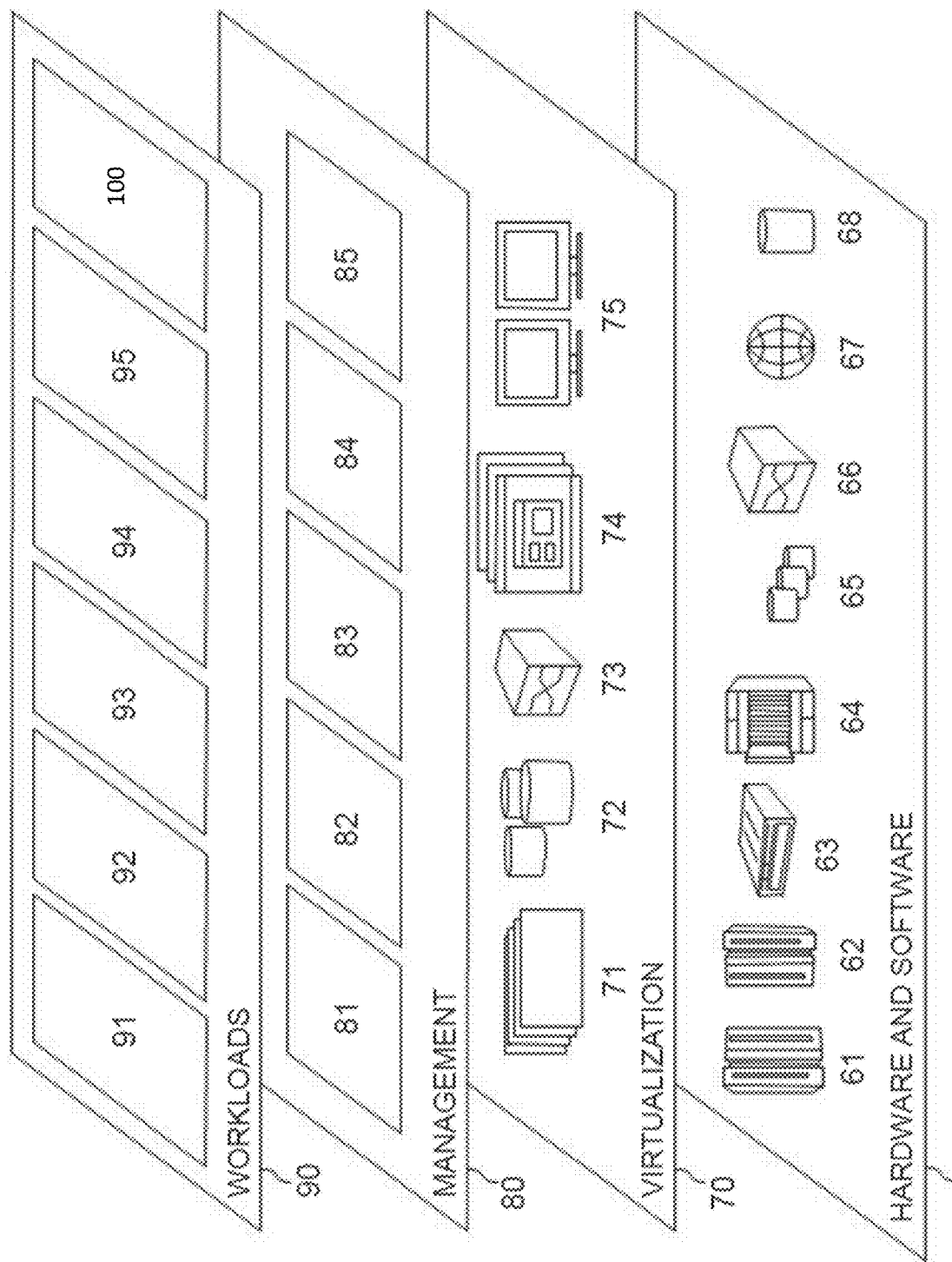
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data presentation method 100 in accordance with the present invention.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented data presentation method through augmented reality, the method comprising:
    creating a file container for a presentation that supports raw data embedding including definition of available interactions and levels of confidentiality of information for the presentation;
    streaming presentation content from the file container to a plurality of augmented reality devices and standard devices; and
    generating a personalized individual interactive experience of the presentation content for one person wearing an augmented reality device in the plurality of augmented reality devices such that the personalized individual interactive experience is different than the presentation content received by the standard devices,
    wherein the raw data embedding includes a modality as a file type in the file container for an augmented reality output to the augmented reality device, and
    wherein the file type comprises a .pptar file type.

2. The computer-implemented method of claim 1, wherein the personalized individual interactive experience is generated by a query to the file container, and
    wherein the file type comprises a specific file type configured for augmented content.

3. The computer-implemented method of claim 1, wherein the generating generates the personalized individual interactive experience from the file container without interrupting the presentation.

4. The computer-implemented method of claim 1, wherein the levels of confidentiality of information for the presentation restrict the generating from generating an unauthorized personalized individual interactive experience for a person without access to the information.

5. The computer-implemented method of claim 1, embodied in a cloud-computing environment.

6. A computer program product for data presentation through augmented reality, the computer program product comprising a non-transitory computer-readable storage medium having program instructions embodied therewith, the program instructions executable by a computer to cause the computer to perform:
    creating a file container for a presentation that supports raw data embedding including definition of available interactions and levels of confidentiality of information for the presentation;
    streaming presentation content from the file container to a plurality of augmented reality devices and standard devices; and
    generating a personalized individual interactive experience of the presentation content for one person wearing an augmented reality device in the plurality of augmented reality devices such that the personalized individual interactive experience is different than the presentation content received by the standard devices,
    wherein the raw data embedding includes a modality as a file type in the file container for an augmented reality output to the augmented reality device, and
    wherein the file type comprises a .pptar file type.

7. The computer program product of claim 6, wherein the personalized individual interactive experience is generated by a query to the file container.

8. The computer program product of claim 6, wherein the generating generates the personalized individual interactive experience from the file container without interrupting the presentation.

9. The computer program product of claim 6, wherein the levels of confidentiality of information for the presentation restrict the generating from generating an unauthorized personalized individual interactive experience for a person without access to the information.

10. A data presentation system through augmented reality, the system comprising:
    a processor; and
    a memory, the memory storing instructions to cause the processor to perform:
        creating a file container for a presentation that supports raw data embedding including definition of available interactions and levels of confidentiality of information for the presentation;
        streaming presentation content from the file container to a plurality of augmented reality devices and standard devices; and
        generating a personalized individual interactive experience of the presentation content for at least one person wearing an augmented reality device in the plurality of augmented reality devices such that the personalized individual interactive experience is different than the presentation content received by the standard devices,
    wherein the raw data embedding includes a modality as a file type in the file container for an augmented reality output to the augmented reality device, and
    wherein the file type comprises a .pptar file type.

11. The system of claim 10, wherein the personalized individual interactive experience is generated by a query to the file container.

12. The system of claim 10, wherein the generating generates the personalized individual interactive experience from the file container without interrupting the presentation.

13. The system of claim 10, wherein the levels of confidentiality of information for the presentation restrict the generating from generating an unauthorized personalized individual interactive experience for a person without access to the information.

14. The system of claim 10, embodied in a cloud-computing environment.

* * * * *